United States Patent
Walther

(10) Patent No.: US 12,079,596 B1
(45) Date of Patent: Sep. 3, 2024

(54) CODE BUILDER

(71) Applicant: United Services Automobile Association (USAA), San Antonio, TX (US)

(72) Inventor: Thomas Walther, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/731,954

(22) Filed: Apr. 28, 2022

(51) Int. Cl.
*G06F 8/30* (2018.01)

(52) U.S. Cl.
CPC .................................. *G06F 8/30* (2013.01)

(58) Field of Classification Search
CPC ..... G06F 8/20; G06F 8/30; G06F 8/34; G06F 8/35; G06F 8/36; G06F 8/38
See application file for complete search history.

(56) References Cited

U.S. PATENT DOCUMENTS

| | | | |
|---|---|---|---|
| 2021/0157551 A1* | 5/2021 | Bliss | G06N 20/00 |
| 2022/0164207 A1* | 5/2022 | Velammal | G06F 11/3604 |
| 2023/0266969 A1* | 8/2023 | Mohan | G06F 9/541 |
| | | | 712/209 |

* cited by examiner

*Primary Examiner* — Duy Khuong T Nguyen
(74) *Attorney, Agent, or Firm* — Fletcher Yoder, P.C.

(57) ABSTRACT

As the number of software tools and standards have greatly expanded, it has become more difficult for programmers to learn and implement the various tools and standards they may encounter on a daily basis in an efficient and effective manner. Significant work-hours, training, and trial and error may be involved when adopting each new tool and/or standard. The present disclosure relates to a code generator that may receive a variety of inputs, such as user-generated code, software descriptions, software standards, software blueprints, and so on, and generate code based on the inputs.

14 Claims, 15 Drawing Sheets

| README | CHANGELOG | CI/CD CONFIGURATION | CI/CD CONFIGURATION | ADD KUBERNETES CLUSTER |
|---|---|---|---|---|
| NAME | | LAST COMMIT | | LAST UPDATE |
| api/swagger | | | | |
| ci | | | | |
| docs | | | | |
| env_wrapper | | | | |
| gradle / wrapper | | | | |
| grafana_dashboards | | | | |
| ocp_configs | | | | |
| persistence-layer | | | | |
| prometheus | | | | |
| src | | | | |
| .gitattributes | | | | |

FIG. 6

| | |
|---|---|
| ⟲ Dockerfile | INITIAL COMMIT |
| ⊢ HELP.md | INITIAL COMMIT |
| ⊢ README.md | INITIAL COMMIT |
| ▯ access-token | INITIAL COMMIT |
| {..} blueprint.json | INITIAL COMMIT |
| ⟲ build.gradle | APPLY GRADLE MODIFICATIONS FOR SONAR AND JACOCO |
| {..} code-generator.yml | INITIAL COMMIT |
| ⟲ docker-compose.yml | INITIAL COMMIT |
| ⟲ gradle.properties | INITIAL COMMIT |
| ⟲ gradlew | GITLAB FAIL |
| ▯ gradlew.bat | INITIAL COMMIT |
| ▯ run-env.sh | INITIAL COMMIT |
| ⟲ settings.gradle | INITIAL COMMIT |
| {..} shared.yml; | INITIAL COMMIT |
| {..} snow-config.json | INITIAL COMMIT |
| ▯ README.md | |

700

702 — settings.gradle
704 — shared.yml
706 — snow-config.json

FIG. 7

```
900 ─┐
  > ☐ .gradle                126      dependsOn configurations.runtime
  > ☐ .idea                  127      appendix = 'pathing'
  > ☐ build                  128      doFirst {
  > ☐ ci-overrides           129        manifest {
  > ☐ docs                   130          attributes "Class-path": configurations.runtime.files.collect { File it
  > ☐ env_files              131            it.toURL().replaceFirst(/ file. \ / + /,'/')
  > ☐ gradle                 132          }.join(' ')
  > ☐ grafana_dashboards     133        }
  > ☐ ocp_configs            134      }
  > ☐ prometheus             135    }
  > ☐ src                    136 ▷ bootRun {
    ☐ .gitattributes         137      dependsOn build
    ☐ .gitignore             138      dependsOn pathingJar
    ☐ .gitlab-ci.yml         139      doFirst() {
    ☐ .gitlab-ci_backup.yml  140        setEnvironmentVariables(environment)
    ☐ access-token           141        classpath = files(sourceSets.main.output.files, pathingJar.archivePath)
    ☐ blueprint.json
    ⟳ build.gradle
    ☐ CHANGELOG.md
```

FIG. 9A

| | | |
|---|---|---|
| 🗎 docker-compose.yml | 142 | |
| 🗎 Dockerfile | 143 | `systemProperties = System.properties // support passing -Dsystem.property=value to bootRun task` |
| 🗎 gradle.properties | 144 | `}` |
| ⊠ gradlew | 145 | `configurations.all {` |
| ☐ gradlew.bat | 146 | `resolutionStrategy {` |
| 🗎 HELP.md | 147 | `force "commons-io:commons-io:20030203.000550"` |
| ☐ krb5.conf | 148 | `dependencySusbitution {` |
| 🗎 README.md | 149 | `//Force Netty to 4.1.66 to avoid TwistLock Vulnerability` |
| ⊠ run-env.sh | 150 | `substitute module("io.netty:3.10.6.Final") with module("io.netty-all-4.1.61.Final")` |
| ⊠ run_git_push.sh | 151 | `substitute module("com.github.tomakehurst:wiremock-standalone:2.20.0") with module("com.github.tomak` |
| 🗎 shared.yml | 152 | `substitute module("org.apache.commons:commons-compress:1.19") with module("org.apache.commons:common` |
| ○ snow-config.json | 153 | `substitute module("io.netty:netty-code:4.1.65.Final") with module ("io.netty:netty-code:4.1.68.Final")` |
| ○ swagger.json | 154 | `}` |
| ○ swagger.yaml | 155 | `}` |
| > ☐ External Libraries | 156 | `}` |
| > ⊙ Scratches and Consoles | | |

```
1100
> .gradle
> .idea
> build
> ci-overrides
> docs
> env_files
> gradle
> grafana_dashboards
> ocp_configs
> prometheus
v src
  > integrationTest
  v main
    v java
      v com.xyz.grp.bk.deposits.acquisition.esign
        > cache
        > config
        v controller
          > advice
            © RestResponseEntityExceptionHandler
```

```
 3   import...
18
19   @ControllerAdvice
20   @AllArgsConstructor
21   public class RestResponseEntityExceptionHandler extends RestResponseEntityExceptionHandler {
22
23      private final BankJournalTransaction journalService;
24
25      @ExceptionHandler(value = {
26         ConstrainViolantionException.class,
27         ValidationException.class,
28         IllegalStateException.class,
29         AccessDeniedException.class,
30         AuthenticationException.class,
31         CustomBusinessException.class,
32         CustomSystemException.class,
```

FIG. 11A

```
   v ⊟ definition
      ⊙ ApplicationApi
      ⊙ JobsApi
   v ⊟ impl
      ⊙ ApplicationsApiController
      ⊙ JobsApiController
   > ⊟ exception
   > ⊟ interceptor
   > ⊟ jaeger
   > ⊟ mapper
   > ⊟ messaging
   > ⊟ model
   > ⊟ security.provider
   > ⊟ service
   > ⊟ utils
   > ⊟ web
   > ⊟ we.client
   Ⓒ BKDepositsAcquisitionEsignApplication
```

```
33   InvalidPartyIdTypeException.class,
34   Exception.class
35   })
36   protected ResponseEntity<?> handleConflict(RuntimeException ex) {
37   ResonseEntity<?> responseEntity = ExceptionResponseGenerator.generator(ex);
38   CompletableFuture.runAsync(()→journalService.logBankJournalTransaction( channel: null,
39                   member: null, responseEntity.gerStatusCode()));
40
41   return responseEntity;
42   }
43   }
44
45
```

FIG. 11B

```
1200
> ci-overrides
> docs
> env_files
> gradle
> grafana_dashboards
> ocp_configs
> prometheus
v src
  > integration Test
  v main
    v java
      v com.xyz.grp.bk.deposits.acquisition.esign
        > cache
        v config
          @ ApplicationConfiguration
          @ AuthenticationConfig
          @ EsignInterceptionrConfig
          @ HazelcastConfig
          @ MetricsConfig
          @ OpenTracingConfig
          @ SecurityConfig
        > controller
        > exception
        > interceptor
        > jaeger
        > mapper
        > messaging
        > model
        > security.provider
        > service
```

```
23  @Slf4j
24  @Configuration
25  @ConditionalOnProperty(name = "xyz.modules.security-enabled",havingValue = "true", matchIfMissing = true)
26  @EnableWebSecurity
27  @EnableGlobalMethodSecurity(jsr250Enabled = true, prePostEnable = true)
28  @RequiredArgsConstructor
29  Public class SecurityConfig extends WebSecurityConfigurerAdapter {
30
31    @Value("${security.whitelist}")
32    private String[] whitelist;
33
34    @Value("${security.actuatorList}")
35    private String[] actuatorList;
36
37    @Value("${actuator.endpoint.path}")
38    private String actuatorEndpoint;
39
40    @Value("${actuator.secure.authority}")
41    private String actuatorAuthority;
42
43    private final AuthenticationEntryPoint authenticationEntryPoint;
44    private final xyzAuthenticationProvider xyzAuthenticationProvider;
45    private final AuthenticationFailureHandler customFailureHandler;
46    private final AuthenticationConverter authenticationConverter;
47
48
```

CODE BUILDER

BACKGROUND

The present disclosure relates generally to software code. In particular, the present disclosure is directed to efficiently creating software applications (e.g., an application programming interface (API)) via automatic generation of software code.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications (e.g., APIs), and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. SaaS products may have one or more APIs that enable the SaaS products to exchange data with various applications. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

In recent years, the number of software tools and standards that may be used to create and implement the products and software applications described above have greatly expanded. As such, it may become increasingly difficult for programmers to learn and implement the myriad tools and standards in an efficient and effective manner. Significant work hours, training, and trial and error may be involved for each new tool and standard. Moreover, similar costs may be incurred for each subsequent update to the tools and/or standards programmers adopt. As new software tools and standards are continuously being created, improved, and updated, these accrued costs may negatively impact organizations that deal heavily in the software space.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Described herein are systems and techniques for efficiently developing computer coding projects. Specifically, a code generator service facilitates efficient project development by automatically generating computer code for a myriad of software tools used to develop and/or support the project. For example, the code generator service may receive a project design pattern via a graphical user interface (GUI) and based upon the design, generate code that may be supplemented with specific business rule code to result in a complete project. Through the generated code, consistent tool interfaces are generated, creating new processing efficiencies and resulting in clear and consistent interfaces for all projects utilizing the code generator service.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 is an exemplary illustration of a project source code GUI that may be output by the code generator service of FIG. 1, in accordance with aspects of the present disclosure;

FIG. 7 is an exemplary illustration of a GUI, the GUI including various files that may be generated by the code generator service of FIG. 1, in accordance with aspects of the present disclosure;

FIG. 9A is an exemplary illustration of a build automation tool configuration file generated by the code generator service of FIG. 1, in accordance with aspects of the present disclosure;

FIG. 9B is another exemplary illustration of the build automation tool configuration file of FIG. 9A, in accordance with aspects of the present disclosure;

FIG. 11A is an exemplary illustration of a file received from a software editor of the system of FIG. 1, in accordance with aspects of the present disclosure;

FIG. 11B is another exemplary illustration of the file illustrated in FIG. 11A, in accordance with aspects of the present disclosure;

FIG. 12 is an exemplary illustration of a security configuration file generated by the code generator service of FIG. 1, in accordance with aspects of the present disclosure; and FIG. 13 is an exemplary illustration of an exception handling configuration file generated by the code generator service of FIG. 1, in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As the number of software tools and standards have greatly expanded, it has become more difficult for programmers to learn and implement the various tools and standards they may encounter on a daily basis in an efficient and effective manner. Significant work-hours, training, and trial and error may be involved when adopting each new tool and/or standard. Moreover, this cost may be incurred for subsequent updates to the various tools and/or standards programmers must adapt to and use. As new software tools and standards are continuously being created, improved, and updated, these accumulating costs may negatively impact companies and organizations that deal heavily in the software space. Further, with different developers implementing these tools and standards, there may be significant inconsistencies in how these implementations are executed and there is no guarantee that the implementations will satisfy organizational requirements. This can result in significant project sustaining costs and introduces potential errors in project implementation.

As such, it may be beneficial to create and implement a system in which potentially reusable code is automatically generated to supplement user-generated code, which may reduce the time and work hours involved in building and implementing a software project (e.g., an application user interface (API)) and create consistent and accurate cross-project code, resulting in reduced sustaining efforts and increased processing accuracy. Moreover, it may be beneficial to enable the system to dynamically generate the code based on a variety of inputs. The inputs may include various parameters that may enable the system to tailor the generated code to implement code to effectuate a user's or organization's specific goal or set of goals. For example, the system may generate code to include functionality pertaining to security, certain utilities, persistence, resiliency, messaging, and so on. Moreover, the code generator may provide test scenarios, test environments, documentation, and so on to facilitate building and implementing the project.

Figure 1:
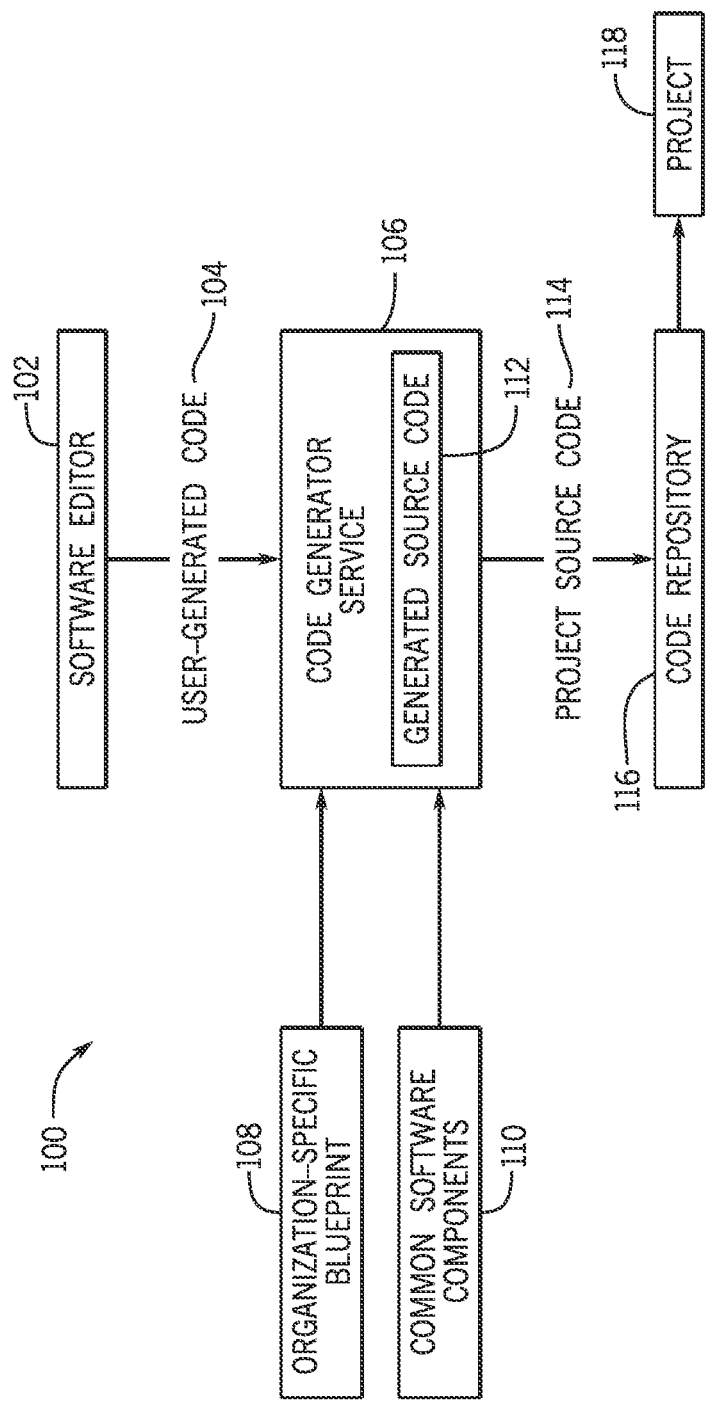
FIG. 1 is a block diagram of a system including a code generator service for generating code based on a variety of inputs and storing the code in a software code repository, in accordance with aspects of the present disclosure.

With the preceding in mind, FIG. 1 is a diagram of a system 100 for generating code based on a variety of inputs and storing the code in one or more software code repositories (e.g., local folder and/or a cloud-based code repository). As will be discussed in greater detail below, a software editor 102 (e.g., an API editor, such as Swagger Editor) may output user-generated code 104 (e.g., an API specification) to a code generator service 106. The code generator service 106 may generate generated source code 112 and combine the generated source code 112 with the user-generated source code 104 to output project source code 114 based at least on an organization-specific blueprint 108, and common software components 110 that a user (e.g., a software programmer or designer) may select (e.g., via a code generator service graphical user interface (GUI)) to implement desired functionality into the user's application (e.g., an API). If the user does not select a particular organization-specific blueprint 108, the code generator service 106 may dynamically select or generate one. As used herein, a blueprint is defined as a diagram, schema, or visualization of the architecture at the conceptual, logical and physical level of an enterprise, showing concepts, their elements, the components that implement the elements and their interrelationships. The code generator service 106 may organize, sequence, and/or standardize the user-generated code 104 and the generated source code 112 based on the organization-specific blueprint 108 (e.g., received from a database of blueprints) according to the type of application or project for which the user-generated code 104 is designed, and may dynamically generate the generated source code 112 to supplement the user-generated code 104 based on the organization-specific blueprints 108 and the common software components 110.

In one embodiment, the code generator service 106 may dynamically determine the organization-specific blueprint 108 and/or the common software components 110 to be used and implemented based on the user-generated code 104 and other information. In another embodiment, the code generator service 106 may determine the organization-specific blueprint 108 and/or the common software components 110 based on user input (e.g., input received via a GUI). The code generator service 106 may combine the generated source code 112 with the user-generated code 104 to generate the project source code 114. The code generator service 106 may export the project source code 114 to a software code repository 116. The software code repository 116 may provide the generated source code 112 for use in a project 118 (e.g., an API).

Figure 2:
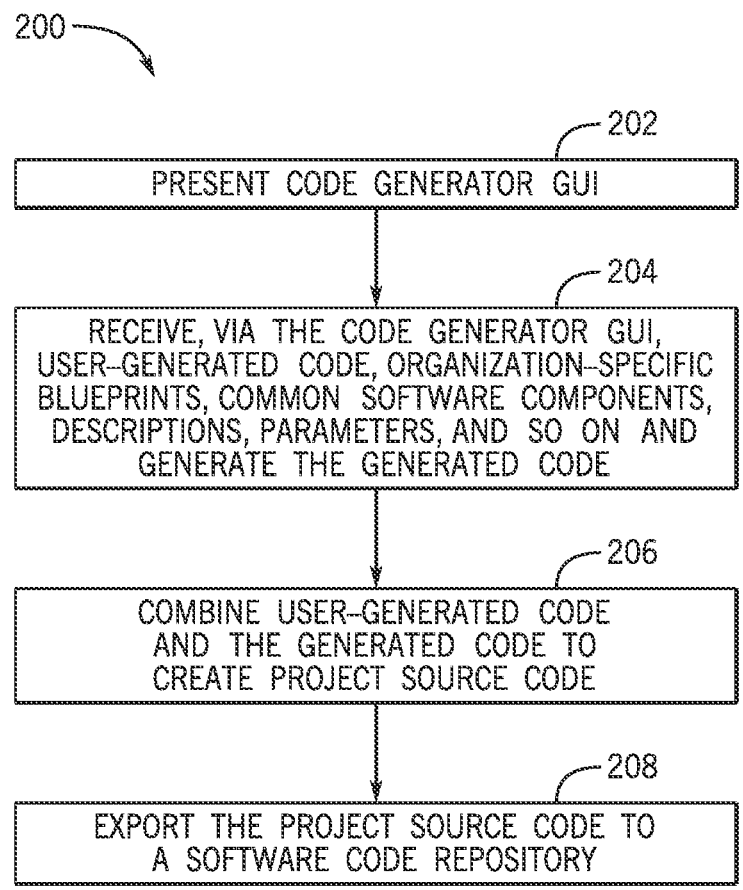
FIG. 2 is a flowchart of a process for generating code based on a variety of inputs and storing the code in a software code repository via the system of FIG. 1, in accordance with aspects of the present disclosure.

FIG. 2 is a flowchart of a process 200 for generating code based on a variety of inputs and storing the code in a software code repository (e.g., 116) via the system 100. Any suitable device (e.g., a controller) that may control components of an electronic device, such as a processor of a server on which the code generator service 106 operates, may perform the process 200. In some embodiments, the process 200 may be implemented by executing instructions stored in a tangible, non-transitory, computer-readable medium, such as a memory, using the processor. For example, the process 200 may be performed at least in part by one or more software components, such as an operating system of the electronic device, one or more software applications of the electronic device, and the like. While the process 200 is described using steps in a specific sequence, it should be understood that the present disclosure contemplates that the described steps may be performed in different sequences than the sequence illustrated, and certain described steps may be skipped or not performed altogether.

Figure 3:
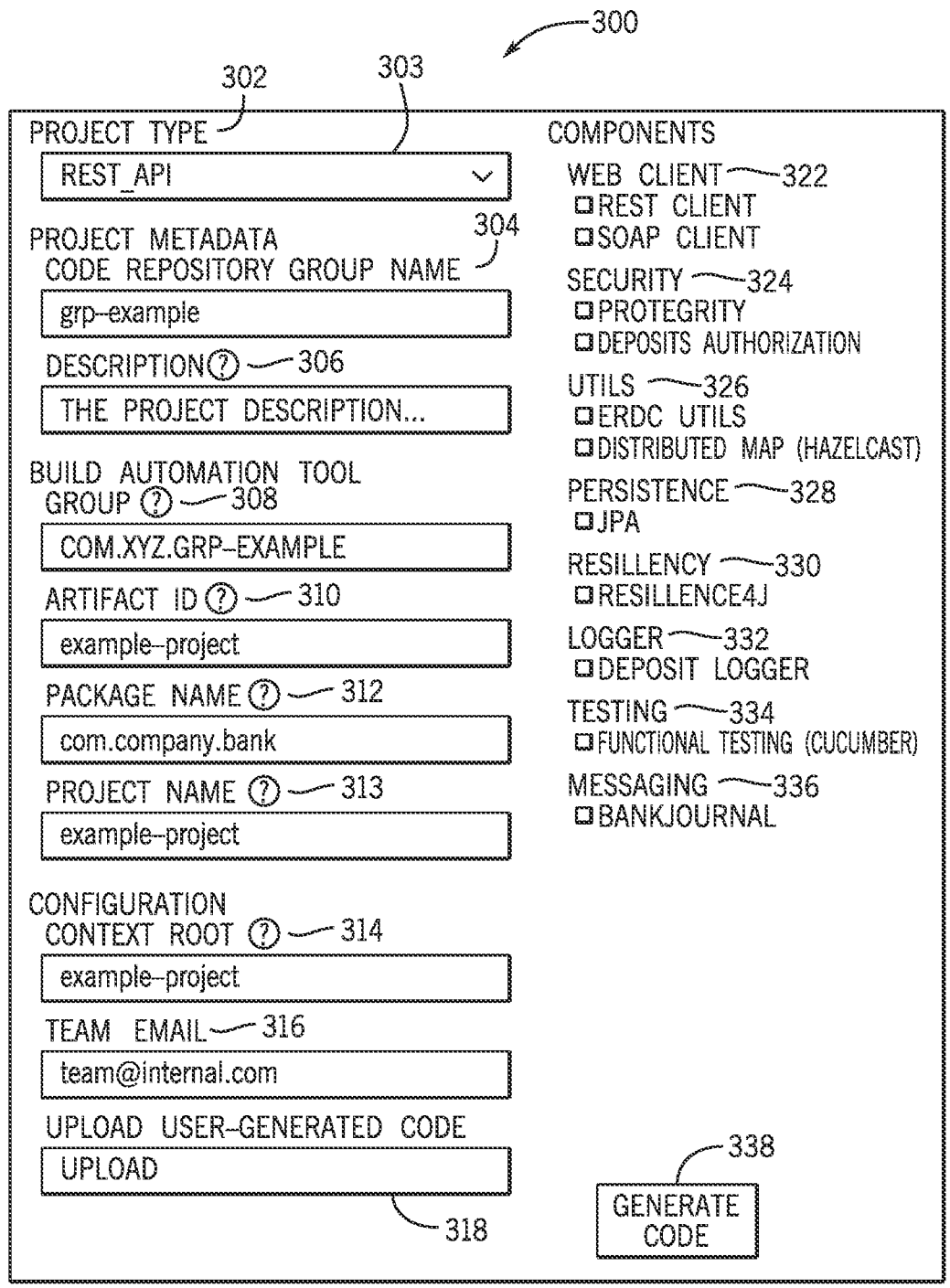
FIG. 3 is an example of a code generator graphical user interface (GUI) via which inputs may be received to carry out the method of FIG. 2, in accordance with aspects of the present disclosure.

In process block 202, the code generator service 106 may present a code generator graphical user interface (GUI) to the user. The code generator GUI may enable a user to input various files (e.g., the user-generated code 104), descriptions and parameters, which the code generator service 106 may use to generate the generated source code and the project source code 114. FIG. 3 illustrates an example of a code generator GUI 300. The code generator GUI 300 may include a variety of input fields, menus, and affordances by which the user may input the various files, descriptions, and parameters. As may be observed, the code generator GUI 300 may present multiple fields and affordances in which to insert user-generated code, descriptions, and/or parameters on which the code generator service 106 may operate in order to generate the generated source code 112 and the project source code 114.

As previously stated, the code generator GUI 300 may include fields that enable a user to describe and/or parameterize the project (e.g., an API). For example, the code generator GUI may include a project type field 302 (e.g., a drop-down menu) via which a project type may be selected. For instance, if a user is attempting to program a representational state transfer (REST) API, the user may select a "REST API" affordance 303 from the project type field 302. The code generator GUI 300 may include project metadata fields such as a code repository group name field 304 and a project description field 306. The group name field 304 may receive a group name associated with a particular project in a code repository (e.g., GitHub). For instance, there may be a group for projects related to handling bank deposits, a group for handling credit card fraud, and so on. Based on the group name, the code generator service 106 may obtain information from the code repository that may enable members of a workgroup within an organization to access the project based on each member's access permissions.

The code generator GUI 300 may include a build automation tool group field 308, an artifact ID field 310, a package name field 312, and a project name field 313. The build automation group field 308 may operate similarly to the code repository group name, but may apply specifically to build automation tools (e.g., Apache Maven, Gradle). The artifact ID field 310, the package name field 312, and the project name field 313 may receive build automation tool project names or project descriptions, similar to the project description field 306.

The code generator GUI 300 may include configuration fields, such as a context root field 314 (e.g., defining a location at which the project may be found), a team email field 316, and an affordance 318 to upload a file (e.g., a file including the user generated code 104). For example, if "REST API" is selected in the project type field 302, the file may include an API editor (e.g., Swagger) file. The data input into the fields of the code generator GUI 300 may enable the code generator service 106 to determine an organization-specific blueprint 108 to follow, and organize and sequence the generated source code 112 and the project source code 116 to conform to the organization-specific blueprint 108.

The code generator GUI 300 may also include one or more affordances that may include components (e.g., the common software components 110) which, when selected, may alter the generated source code 112 such that the generated source code 112 implements the functionality of the selected components. The components may include a web client affordance 322, a security affordance 324, a utilities affordance 326 a persistence affordance 328 (e.g., to implement a persistence API, such as Java Persistence API), a resiliency affordance 330 (e.g., to implement a fault tolerance library, such as the Java Resilience4j library), a logger affordance 332, a testing affordance 334, and a messaging affordance 336. As will be discussed in more detail below, code associated with the selected components may be retrieved (e.g., from a software library) for incorporation into the generated code.

Upon inputting the desired information into the various fields and selecting the various affordances, the user may select a code generation affordance 338. In response to receiving the input from the code generator GUI 300, the code generator service 106 may determine a framework (e.g., based on the organization-specific blueprint 108) and use the framework to generate the project source code 114. If the standard or format of the file uploaded via the user-generated code affordance 318 is different than a desired standard or format, the standard of the file uploaded via the user-generated code affordance 318 may be modified to comply with the desired standard. It should be noted that the fields and affordances discussed above are merely exemplary, and the code generator GUI 300 may include any appropriate number (e.g., one, two, ten, fifty, 100, and so on) of fields and/or affordances to describe and/or parameterize the generated source code 112 and/or the project source code 114.

Figure 4:
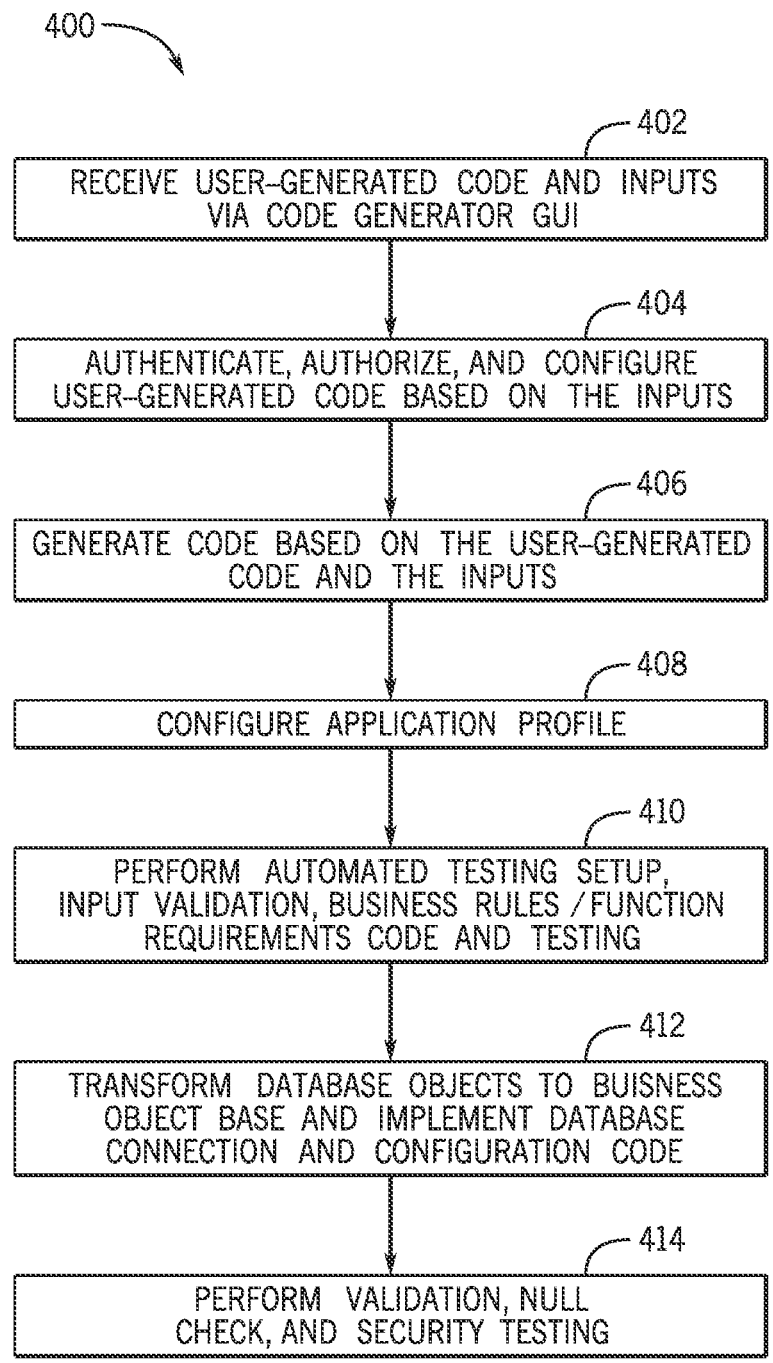
FIG. 4 is a flowchart of a process by which a code generator service of the system of FIG. 1 may generate and configure the generated code via the method of FIG. 2 and may perform various tests on the generated code, in accordance with aspects of the present disclosure.

Returning to FIG. 2, in process block 204, the code generator service 106 may receive, via the code generator GUI 300, the user-generated code 104, organization-specific blueprints 108, common software components, descriptions, parameters, and so on, as discussed above, and generate the generated source code (process block 204). FIG. 4 is a flowchart of a process 400 by which the code generator service 106 may generate and configure the generated source code 112 as described in the process block 204 of FIG. 2 and may perform various tests on the generated source code 112. Any suitable device (e.g., a controller) that may control components of an electronic device, such as a processor of a server on which the code generator service 106 operates, may perform the process 400. In some embodiments, the process 400 may be implemented by executing instructions stored in a tangible, non-transitory, computer-readable medium, such as a memory, using the processor. For example, the process 400 may be performed at least in part by one or more software components, such as an operating system of the electronic device, one or more software applications of the electronic device, and the like. While the process 400 is described using steps in a specific sequence, it should be understood that the present disclosure contemplates that the described steps may be performed in different sequences than the sequence illustrated, and certain described steps may be skipped or not performed altogether.

In process block 402, the code generator service 106 receives the user-generated code 104 and inputs via the code generator GUI 300, as detailed in the discussion of FIG. 3 above. In process block 404, the code generator service 106 authenticates, authorizes, and configures the user-generated code 104 based on the inputs received via the code generator GUI 300. In process block 406, the code generator service 106 dynamically generates the generated source code 112. In the process block 406, endpoint code for an API may be generated. By dynamically generating the generated source code 112, the code generator service 106 may produce large portions of code using tools and standards required for the project source code 114 with little input (e.g., only the user-generated code 104 and inputs to the code generator GUI 300) from designers. In this way, the code generator service may significantly reduce the time and cost of producing project source code (e.g., 114).

In process block 408, the code generator service configures the application profile. Configuring the application profile may include generating various environments, such as generating a testing environment. In process block 410 the code generator service 106 sends the generated source code 112 to a user device, such that the user may perform setup for automated testing of the generated source code 112, perform input validation, and/or input business rules/functional requirement code and perform business rules/functional requirement testing. During the process of the process block 410 (e.g., following input validation) setup may be performed on various components and/or API tools. For example, setup may be performed on a cloud security platform (e.g., Twistlock) and/or a build automation tool (e.g., Gradle). In process block 412, the code generator service 106 may transform database objects to business object base and implement database connection and configuration code. In process block 414, the code generator service may perform validation, null check, and security testing. In this way, the process 400 of FIG. 4 may generate and configure the generated source code 112 and may perform various tests on the generated source code 112.

Figure 5:
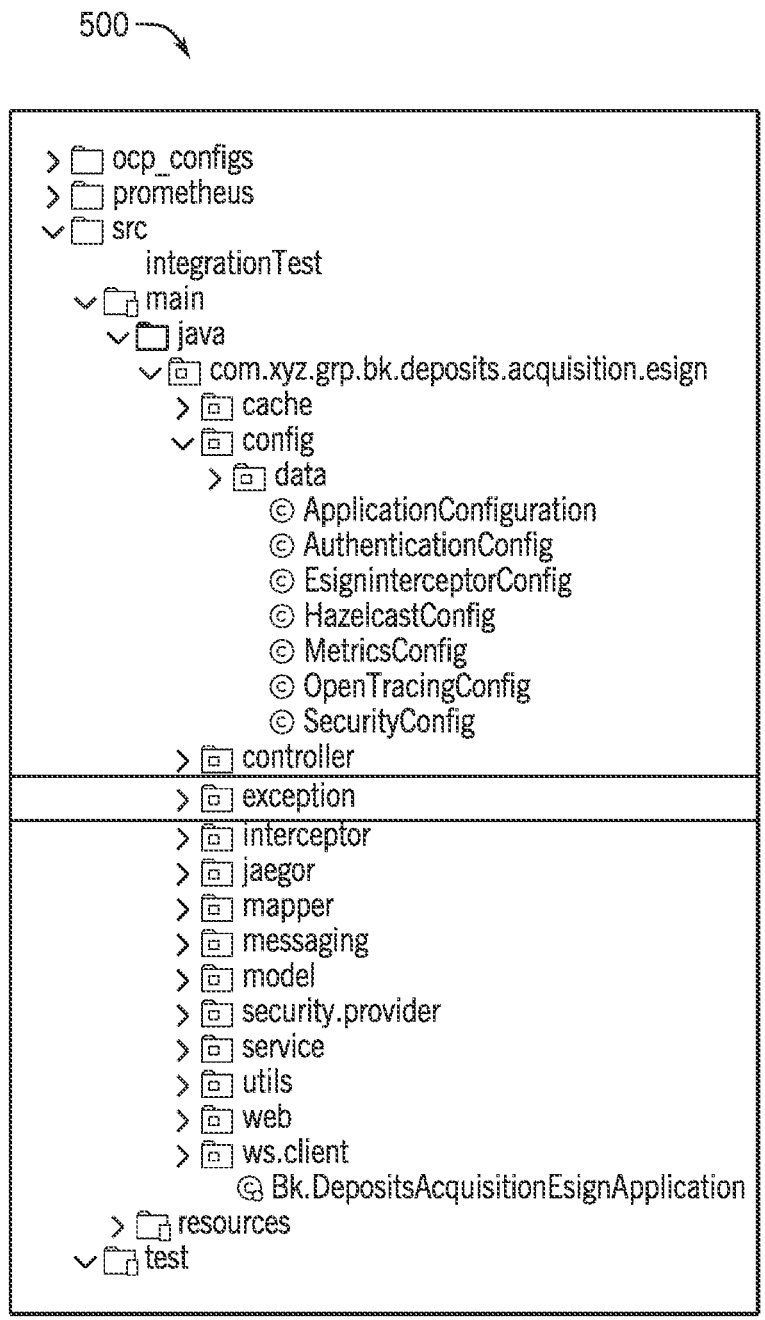
FIG. 5 is an illustration of an exemplary list of files that may be generated as part of the generated source code based on the input received via the code generation GUI of FIG. 3, in accordance with aspects of the present disclosure.

The generated source code 112 may be viewed in a GUI as individual files containing the generated source code 112 that may help perform various functionalities. FIG. 5 is an illustration of an exemplary list of files 500 that may be generated as part of the generated source code 112 based on the input received via the code generation GUI 300. Returning to FIG. 2, in process block 206, the code generator service 106 may combine the user-generated code 104 and the generated source code 112 to create the project source code 114 for the project 118 (e.g., an API). For example, the code generator service 106 may generate the generated source code 112 and output the project source code 114 based on the user inputs to the code generator service GUI 300 and in response to the user selecting the generate code affordance 338.

In process block 208, the code generator service 106 exports the project source code 114 to the code repository 116 (e.g., GitHub and/or a local folder). FIG. 6 is an exemplary illustration of a project source code GUI 600. The project source code GUI 600 may include folders that include various files. The files may include project source code 114 based on the user-generated source code 104 and/or the generated source code 112. Once the project source code 114 is uploaded to the code repository 116, the project source code 114 may be shared, modified, updated, used to implement the project 118 (e.g., an API).

FIG. 7 is an exemplary illustration of a GUI 700 including various files that may be generated in response to the user selecting the generate code affordance 338. The files may include setting and configuration files for a variety of tools used in generating the project source code 114. For example, the GUI 700 may include a settings file 702 for a build automation tool (e.g., Gradle), a shared .yml file 704, an API configuration file 706, and so on. FIG. 8-FIG. 13 are examples of various files that may be generated by the code generator service 106 based on the inputs to the code generator GUI 300. The list of files discussed below is not exhaustive, and there may be more or fewer files generated by the code generator service 106. Further, the files discussed below may be automatically modified by the code generator service 106 to conform to a given standard (e.g., a standard conforming to the organization-specific blueprint 108).

Figure 8:
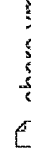
FIG. 8 is an exemplary illustration of a .yml file included in the GUI of FIG. 7, in accordance with aspects of the present disclosure.

FIG. 8 is an exemplary illustration of a .yml file (e.g., the shared .yml file 704). The shared .yml file 704 may include information such as versioning information 802, 804, and 816. The shared .yml file 704 may also include file information based on the inputs to the code generator GUI 300, such as information regarding a group 806, a group name 808, a project name 810, a context root 812, a context path 814, and a project description 818.

Figure 10:
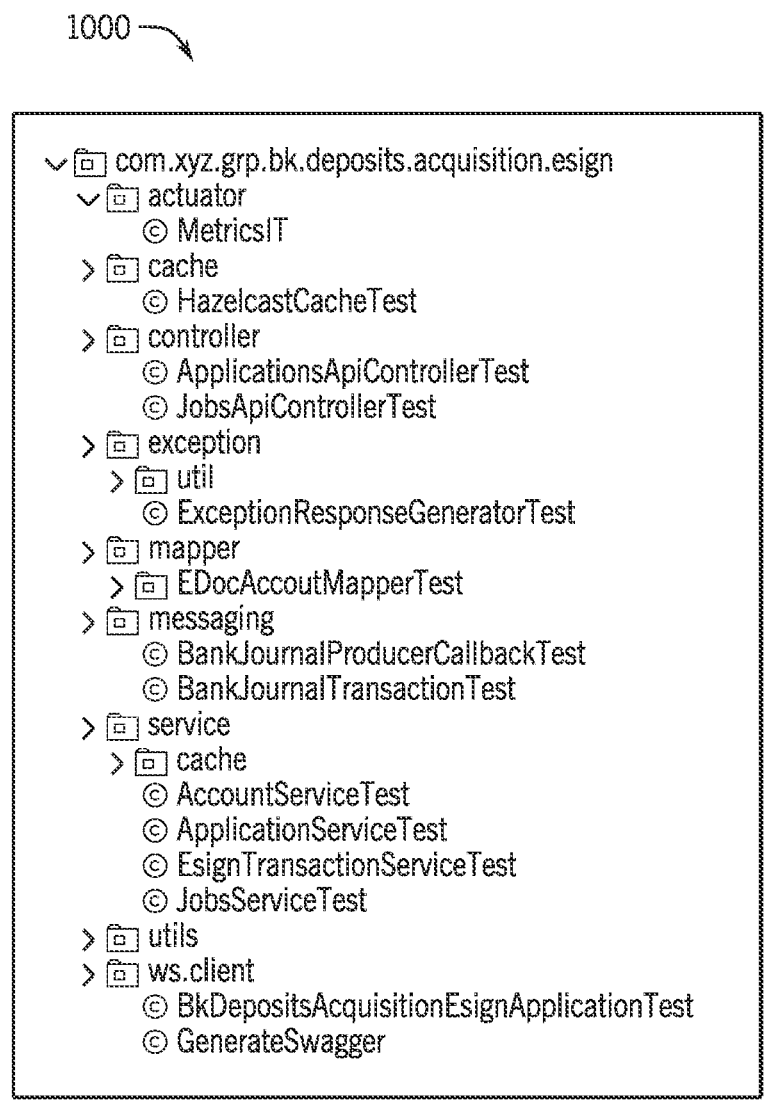
FIG. 10 is an exemplary illustration of a number of generated test case files generated by the code generator service of FIG. 1, in accordance with aspects of the present disclosure.
Figure 13:
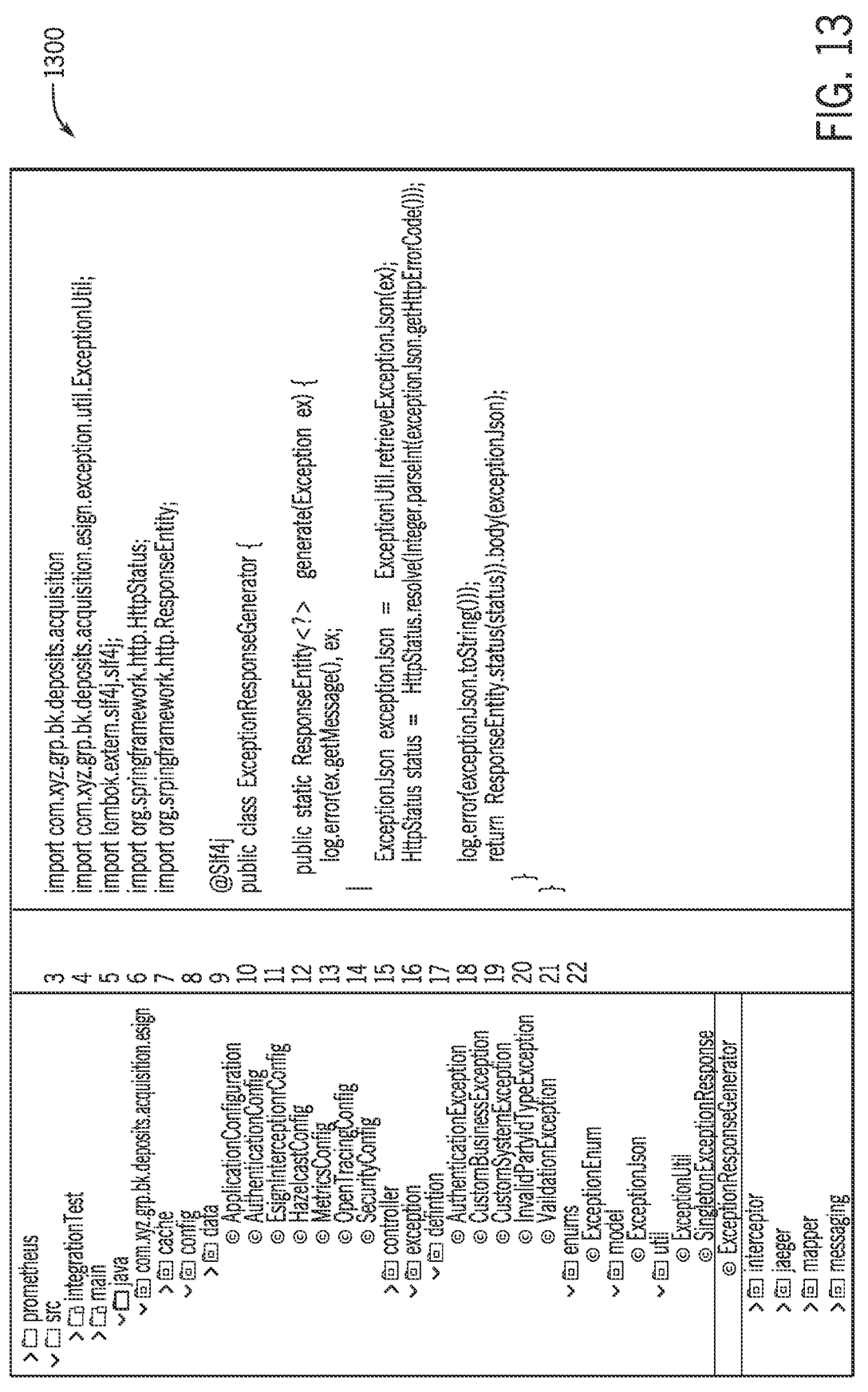

FIG. 9 and FIG. 9B are exemplary illustrations of a build automation tool configuration file 900. FIG. 10 is an exemplary illustration of a number of generated test case files 1000. FIG. 11A and FIG. 11B are exemplary illustrations of a file 1100 received from the software editor 102. The code in the file 1100 may be modified by the code generator service 106 to match an organizational standard (e.g., a standard conforming to the organization-specific blueprint 108). FIG. 12 is an exemplary illustration of a security configuration file 1200. The security configuration file 1200 may generated using a cloud security platform (e.g., Twistlock). FIG. 13 is an exemplary illustration of an exception handling configuration file 1300.

As previously stated, benefits of the embodiments discussed above may include increased productivity by automating, via the code generator service 106, tasks such as producing frequently used coding blocks, code testing, and standardization. By automating these tasks, the coding time, effort, and troubleshooting may be significantly reduced for a substantial portion of a project.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
presenting a code generator graphical user interface (GUI);
receiving, at the code generator GUI, input comprising a file comprising user-generated code written in a first standard, an indication of a software blueprint and a desired software component to add, wherein the input comprises software descriptions, the software descriptions comprising a project type, project metadata, group names, artifact identifiers, package names, project names, context roots, and team email descriptions;
determining, based upon the software blueprint, a framework for machine generation of project source code that conforms to a second standard defined by the software blueprint, wherein the second standard is different from the first standard;
generating, based on the input comprising the user-generated code and the desired software component to add, one or more blocks of code;
generating and outputting, based on the one or more blocks of code and the user-generated code, the project source code in accordance with the framework, wherein generating the project source code comprises converting the user-generated code from the first standard to the second standard; and
exporting the project source code to a code repository.

2. The method of claim 1, wherein available software components for selection as the desired software component comprise web client data, security components, utility components, persistence components, resiliency components, logger components, testing components, and messaging components.

3. The method of claim 2, wherein the persistence components comprises a Java Persistence application programming interface (API).

4. The method of claim 2, wherein the resiliency components comprise a Java Resilience4j fault tolerance library.

5. The method of claim 1, comprising organizing, sequencing, and standardizing of the user-generated code, the generated project source code, or both, based on the software blueprint.

6. The method of claim 5, wherein the software blueprint is determined dynamically.

7. The method of claim 1, wherein the project source code comprises a plurality of files, the plurality of files comprising at least a build automation tool configuration file, a generated test case file, a security configuration file, and an exception handling file.

8. One or more tangible, non-transitory, machine-readable media comprising machine-readable instructions, wherein the instructions, when executed by at least one processor, cause the at least one processor to:
present a code generator graphical user interface (GUI);
receive, at the code generator GUI, input comprising a file comprising user-generated code written in a first standard, software blueprints, software components, or any combination thereof, wherein available software components for selection as the software components comprise web client data, security components, utility components, persistence components, resiliency components, logger components, testing components, and messaging components;
determine, based upon the software blueprints, a framework for machine generation of project source code that conforms to a second standard defined by the software blueprint, wherein the second standard is different from the first standard;
generate, based on the input comprising the file comprising the user-generated code, the software blueprints, the software components, or any combination thereof, one or more blocks of code;
generate and output, based on the one or more blocks of code and the user-generated code, the project source code in accordance with the framework, wherein generating the project source code comprises converting the user-generated code from the first standard to the second standard; and
export the project source code to a code repository.

9. The one or more tangible, non-transitory, machine-readable media of claim 8, wherein the input comprises software descriptions, the software descriptions comprising a project type, project metadata, group names, artifact identifiers, package names, project names, context roots, and team email descriptions.

10. The one or more tangible, non-transitory, machine-readable media of claim 8, wherein the project source code comprises a plurality of files, the plurality of files comprising at least a build automation tool configuration file, a generated test case file, a security configuration file, and an exception handling file.

11. A computer-implemented method, comprising:
receiving, at a code generator graphical user interface, a file comprising user-generated code written in a first standard, and inputs comprising software blueprints and software components, wherein the inputs comprise software descriptions, the software descriptions comprising a project type, project metadata, group names, artifact identifiers, package names, project names, context roots, and team email descriptions;
authenticating, authorizing, configuring, or any combination thereof, the user-generated code based on inputs comprising the software blueprints, the software components, or both;
determining, based upon the software blueprints, a framework for project source code that conforms to a second standard defined by the software blueprint, the second standard different from the first standard;
generating the project source code in accordance with the framework based on the file comprising the user-generated code, the inputs, or both, wherein generating the project source code comprises converting the user-generated code from the first standard to the second standard;
configuring an application profile;
performing input validation, business rules requirements code, business rules requirements testing, or any combination thereof for automated testing setup;
transforming one or more database objects to a business object base;
implementing a database connection, a database configuration code, or both; and
performing validation, null check, security testing, or any combination thereof on the generated code.

12. The computer-implemented method of claim 11, wherein configuring the application profile comprises generating a testing environment.

13. The computer-implemented method of claim 11, comprising performing setup on one or more application programming interface (API) tools.

14. The computer-implemented method of claim 13, wherein the one or more API tools comprise a cloud security platform and a build automation tool.

* * * * *